United States Patent
Seto

(10) Patent No.: US 7,353,302 B2
(45) Date of Patent: Apr. 1, 2008

(54) SELECTABLE COMMUNICATION CONTROL BETWEEN DEVICES COMMUNICATING USING A SERIAL ATTACHED SCSI (SAS) PROTOCOL

(75) Inventor: Pak-Lung Seto, Shrewsbury, MA (US)

(73) Assignee: Intel Corporation, Santa Clara, CA (US)

( * ) Notice: Subject to any disclaimer, the term of this patent is extended or adjusted under 35 U.S.C. 154(b) by 391 days.

(21) Appl. No.: 10/750,279

(22) Filed: Dec. 31, 2003

(65) Prior Publication Data

US 2005/0143079 A1 Jun. 30, 2005

(51) Int. Cl.
*G06F 3/00* (2006.01)
*G06F 13/00* (2006.01)

(52) U.S. Cl. .................... 710/36; 710/2; 710/305; 711/114; 709/225; 709/230

(58) Field of Classification Search ........ 710/305–316, 710/1–6, 36–40; 711/4, 114; 714/6, 724; 709/223–225, 230
See application file for complete search history.

(56) References Cited

U.S. PATENT DOCUMENTS

| | | | | |
|---|---|---|---|---|
| 5,845,087 | A * | 12/1998 | Trehus | 709/242 |
| 6,965,956 | B1 * | 11/2005 | Herz et al. | 710/74 |
| 7,039,741 | B2 * | 5/2006 | Bakke et al. | 710/300 |
| 7,058,749 | B2 * | 6/2006 | Loffink | 710/313 |
| 2002/0059432 | A1 * | 5/2002 | Masuda et al. | 709/227 |
| 2004/0068580 | A1 * | 4/2004 | Jo et al. | 709/242 |
| 2004/0078508 | A1 * | 4/2004 | Rivard | 711/4 |
| 2004/0098503 | A1 * | 5/2004 | Zhang et al. | 709/238 |
| 2004/0098518 | A1 * | 5/2004 | Beckett et al. | 710/14 |
| 2004/0098645 | A1 * | 5/2004 | Beckett et al. | 714/724 |
| 2004/0205259 | A1 * | 10/2004 | Galloway | 710/3 |
| 2005/0015532 | A1 * | 1/2005 | Beckett et al. | 710/105 |
| 2005/0015655 | A1 * | 1/2005 | Clayton et al. | 714/6 |
| 2005/0066100 | A1 * | 3/2005 | Elliott et al. | 710/300 |
| 2005/0080881 | A1 * | 4/2005 | Voorhees et al. | 709/220 |
| 2005/0097234 | A1 * | 5/2005 | Douglas et al. | 710/15 |
| 2005/0114587 | A1 * | 5/2005 | Chou et al. | 711/103 |
| 2005/0125574 | A1 * | 6/2005 | Foster et al. | 710/36 |

(Continued)

OTHER PUBLICATIONS 802.3 IEEE Standard for Information Technology, Table of Contents, Telecommunications and information exchange between systems- Local and metropolitan area networks- Specific requirements, Part 3: Carrier sense multiple access with collision detection (CSMA/CD) access method and physical layer specifications, (Mar. 8, 2002),11 pgs.

American National Standard for Information Technology- Fibre Channel- Physical and Signalling Interface-3 (FC-PH-3), Developed by incits, Where IT all Begins, Table of Contents, (1998),6 pgs.

(Continued)

*Primary Examiner*—Christoher Shin
(74) *Attorney, Agent, or Firm*—Grossman, Tucker, Perreault & Pfleger, PLLC

(57) ABSTRACT

In one embodiment, an apparatus may include a plurality of ports capable of being coupled to a plurality of devices via an associated plurality of communication links, the links being compliant with Serial Attached Small Computer Systems Interface (SAS) protocol. The apparatus may further include circuitry to provide selectable communication control between at least a first device and at least a second device of the plurality of devices. Of course, many alternatives, variations, and modifications are possible without departing from this embodiment.

20 Claims, 5 Drawing Sheets

U.S. PATENT DOCUMENTS

| | | | |
|---|---|---|---|
| 2005/0138221 A1* | 6/2005 | Marushak | 710/1 |
| 2005/0138261 A1* | 6/2005 | Marushak et al. | 710/316 |
| 2005/0149793 A1* | 7/2005 | Beckett et al. | 714/724 |
| 2005/0289263 A1* | 12/2005 | Ramsey et al. | 710/104 |
| 2006/0004935 A1* | 1/2006 | Seto et al. | 710/62 |

OTHER PUBLICATIONS

PCI Express Base Specification Revision 1.0, PCI Express, Table of Contents, (Jul. 22, 2002),15 pgs.

PCI-X Addendum to the PCI Local Bus Specification, Revision 1.0a, Table of Contents, (Jul. 24, 2000),9 pgs.

Serial ATA: High Speed Serialized AT Attachment, Serial ATA Workgroup, Revision 1.0, Table of Contents, APT Technologies, Inc., (Aug. 29, 2001),10 pgs.

The $I^2C$-Bus Specification, Version 2.1, Table of Contents, Document Order No. 9398 393 40011,(Jan. 2000),2 pgs.

Working Draft American National Standard, Project T10/1601-D, Revision 1, Table of Contents, Information Technology- Serial Attached SCSI- 1.1(SAS-1.1), (Sep. 18, 2003),24 pgs.

* cited by examiner

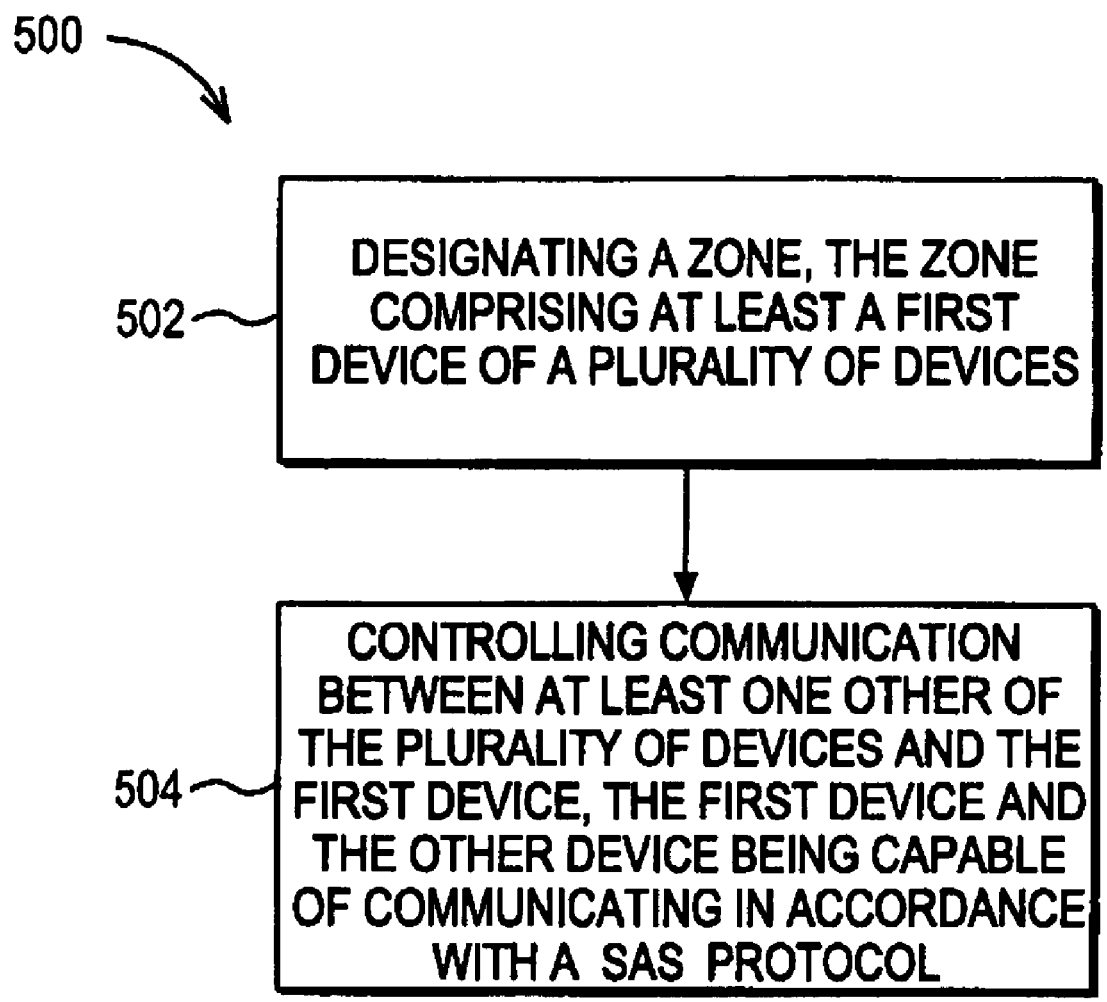

SELECTABLE COMMUNICATION CONTROL BETWEEN DEVICES COMMUNICATING USING A SERIAL ATTACHED SCSI (SAS) PROTOCOL

FIELD

This disclosure relates to communication control.

BACKGROUND

A data storage system may include one device capable of bidirectional communication with another device via a communication network. One device may include a computer node having a host bus adapter (HBA). The other device may be mass storage. Each may function as a sending and receiving device in order to exchange data and/or commands with each other. The system may also include an expander.

The devices may communicate with each other using Serial Attached Small Computer Systems Interface (SAS) communication protocol. The SAS communication protocol may comply or be compatible with the protocol described in "Information Technology—Serial Attached SCSI—1.1 (SAS)," Working Draft, American National Standard of International Committee For Information Technology Standards (INCITS) T10 Technical Committee, Project T10/1562-D, Revision 1, published Sep. 18, 2003, by American National Standards Institute (hereinafter referred to as the "SAS Standard") and/or later-published versions of the SAS Standard.

Unfortunately, the SAS Standard does not provide for selectable communication control using an expander.

BRIEF DESCRIPTION OF THE DRAWINGS

Features and advantages of embodiments of the claimed subject matter will become apparent as the following Detailed Description proceeds, and upon reference to the Drawings, where like numerals depict like parts, and in which:

FIG. 5 is a flow chart illustrating operations consistent with an embodiment.

DETAILED DESCRIPTION

Figure 1:
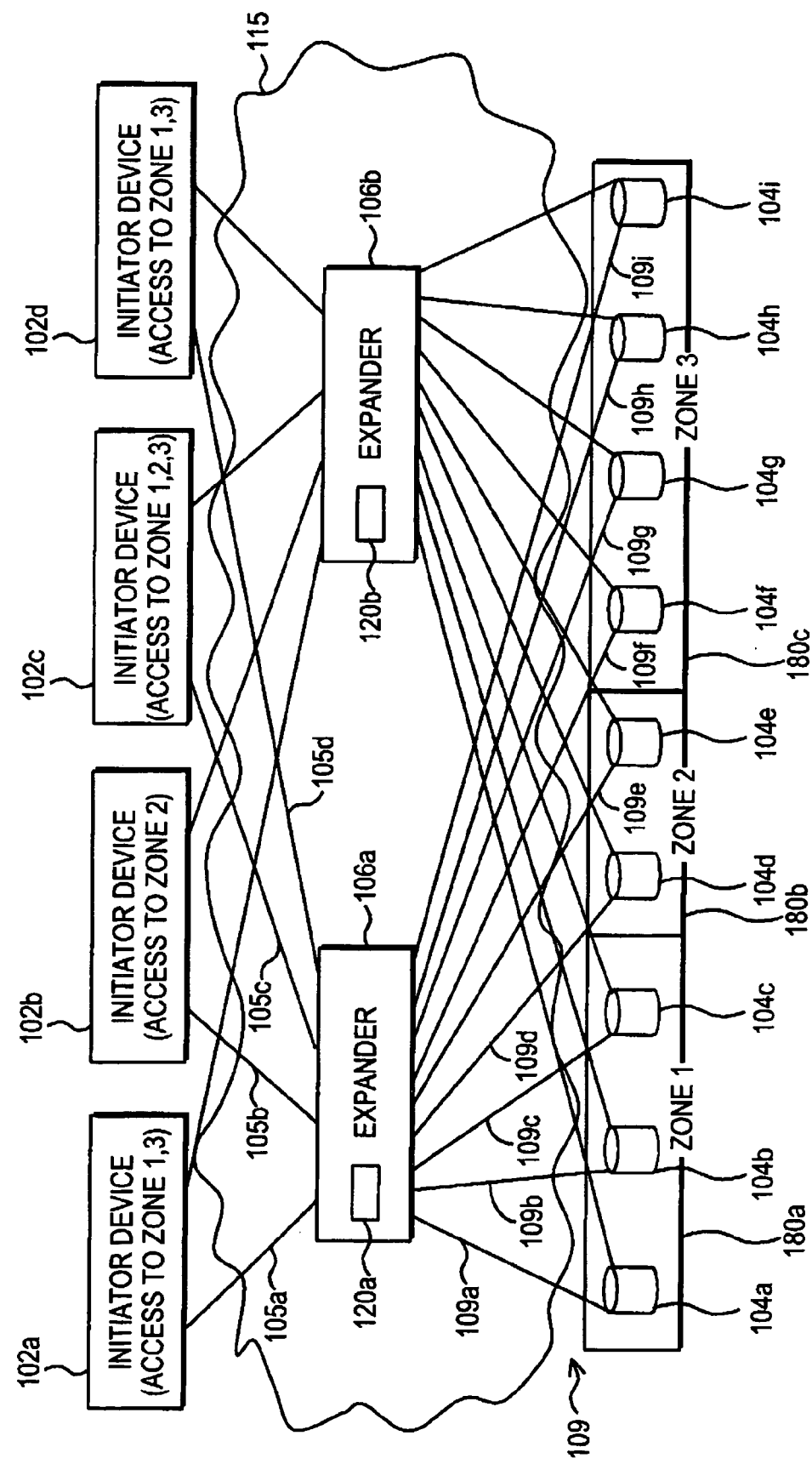
FIG. 1 is a diagram illustrating a system embodiment.

FIG. 1 illustrates a system 100 having a plurality of devices coupled to each other via a communication network 115 for bidirectional communication there between. For clarity of description, devices 102a, 102b, 102c, 102d are referred to as initiator devices and devices 104a, 104b, 104c, 104d, 104e, 104f, 104g, 104h, 104i are referred to as target devices. Each of the initiator devices 102a, 102b, 102c, 102d may be various computer servers each having a respective HBA as further described herein. Each of the target devices 104a, 104b, 104c, 104d, 104e, 104f, 104g, 104h, 104i may comprise mass storage. Each mass storage may include one or more mass storage devices, e.g., one or more redundant arrays of independent disks (RAID) and/or peripheral devices. The initiator devices and target devices may be able to communicate using one or more communication protocols. One such communication protocol may comply or be compatible with the SAS Standard. A device that is capable of communicating in accordance with the SAS Standard is referred to herein as a "SAS device."

The communication network 105 may include one or more expanders 106a, 106b. As used in any embodiment herein, an "expander" may be defined as a device that may facilitate communication among a plurality of devices. An associated plurality of communication links 105 may couple the plurality of initiator devices 102a, 102b, 102c, 102d to the expanders 106a, 106b. Another associated plurality of communication links 109 may couple the expanders 106a, 106b to the plurality of target devices 104a, 104b, 104c, 104d, 104e, 104f, 104g, 104h, 104i. The communication links 105, 109 may include conventional and/or custom cable that may be proscribed for a given device. The communication links 105, 109 may be compliant with a variety of communication protocols such as a protocol consistent with the SAS Standard. The expanders 106a, 106b may have an associated plurality of ports capable of being coupled to the communication links 105 and 109. The expanders 106a, 106b may be fanout expanders or edge expanders. A plurality of edge expanders may be part of an edge expander device set.

Each expander may have communication control circuitry 120a, 120b. "Communication control circuitry," as used in any embodiment herein, may be defined as circuitry to enable and/or facilitate control of communication between at least one device and at least one other device. As used herein, "circuitry" may comprise, for example, singly or in any combination, hardwired circuitry, programmable circuitry, state machine circuitry, and/or firmware that stores instructions executed by programmable circuitry. In one embodiment, such communication control circuitry may be utilized to designate at least one zone among the plurality of devices. For example, the exemplary system 100 of FIG. 1 illustrates three zones 180a, 180b, 180c. The first zone 180a may include target devices 104a, 104b, 104c, the second zone 180b may include target devices 104d, 104e, and the third zone may include target devices 104f, 104g, 104h, 104i.

A zone may be designated by a set of commands provided to each expander 106a, 106b. One device may have access to all other devices of the system. A human user of such device, e.g., a system administrator, may utilize a user interface and software to provide commands from the associated HBA to the communication control circuitry 120a, 120b of the expander 106a, 106b in order to designate, delete, or modify various zones.

As used herein, a "zone" is a group of one or more devices. This may include one or more target devices, one or more initiator devices, or one or more combinations of target and initiator devices. Any one device may also be in one or more zones. In other words, the zones may overlap without departing from this embodiment. For example, target device 104c of FIG. 1 is illustrated as being in only the first zone 180a. However, the target device 104c may also be in another zone, e.g., the second zone 180b.

Once a zone is designated, communication between initiator devices 102a, 102b, 102c, 102d and zones 180a, 180b, or 180c may be controlled. Such control may include restricting access of an initiator device to a specified zone. As used herein, "access" refers to the type of communication, if any that may be allowed between devices. For example, a first initiator device 102a may have access to only the first zone 180a and the third zone 180c. The second initiator device 102b may have access to only the second zone 180b. The third initiator device 102c may have access to all three zones 180a, 180b, 180c, while finally a fourth initiator device 102d may be a fail safe device for initiator device 102a and therefore also have access to only the first zone 180a and the third zone 180c.

Figure 2:
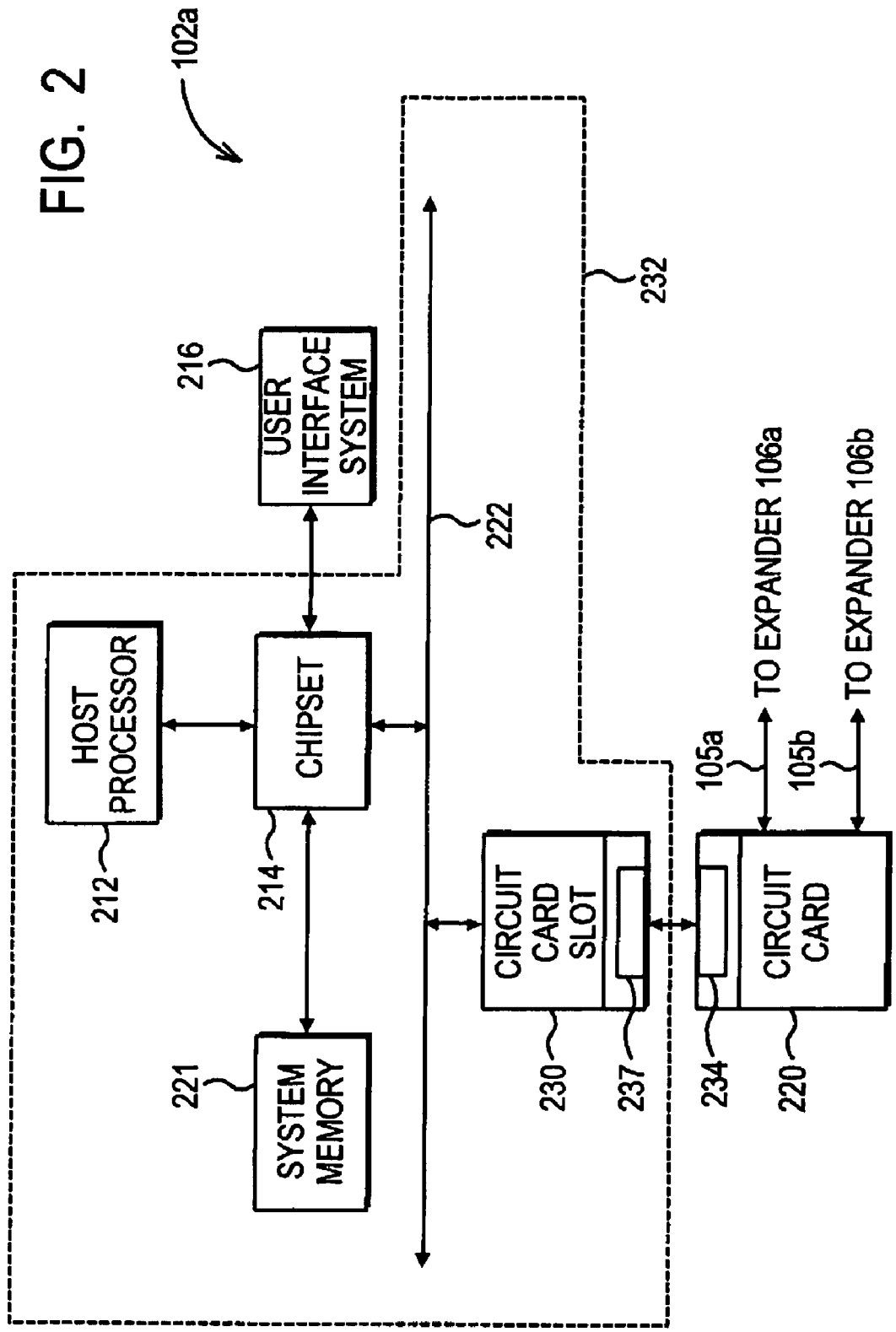
FIG. 2 is a diagram illustrating in greater detail a device in the system embodiment of FIG. 1.

Turing to FIG. 2, a diagram illustrating additional details of one exemplary device 102a of FIG. 1 is illustrated. In general, the initiator device 102a may include a computer node having a host bus adapter (HBA), e.g., circuit card 220, for communicating with any of the plurality of target devices 104a, 104b, 104c, 104d, 104e, 104f, 104g, 104h, 104i. Such communication may take place via communication link 105a and expander 106a and/or via communication link 105b and expander 106b as permitted by the communication control circuitry 120a, 120b.

The initiator device 102a may also generally include a host processor 212, a bus 222, a user interface system 216, a chipset 214, system memory 221, a circuit card slot 230, and the circuit card 220. The host processor 212 may include one or more processors known in the art such as an Intel® Pentium® IV processor commercially available from the Assignee of the subject application. The bus 222 may include various bus types to transfer data and commands. For instance, the bus 222 may comply with the Peripheral Component Interconnect (PCI) Express™ Base Specification Revision 1.0, published Jul. 22, 2002, available from the PCI Special Interest Group, Portland, Oreg., U.S.A. (hereinafter referred to as a "PCI Express™ bus"). The bus 222 may alternatively comply with the PCI-X Specification Rev. 1.0a, Jul. 24, 2000, available from the aforesaid PCI Special Interest Group, Portland, Oreg., U.S.A. (hereinafter referred to as a "PCI-X bus").

The user interface 216 may include one or more devices for a human user to input commands and/or data and/or to monitor the device 102a such as, for example, a keyboard, pointing device, and/or video display. The chipset 214 may include a host bridge/hub system (not shown) that couples the processor 212, system memory 221, and user interface system 216 to each other and to the bus 222. Chipset 214 may include one or more integrated circuit chips, such as those selected from integrated circuit chipsets commercially available from the Assignee of the subject application (e.g., graphics memory and I/O controller hub chipsets), although other integrated circuit chips may also, or alternatively be used. The processor 212, system memory 221, chipset 214, bus 222, and circuit card slot 230 may be on one circuit board 232 such as a system motherboard.

The circuit card 220 may be constructed to permit it to be inserted into the circuit card slot 230. When the circuit card 220 is properly inserted into the slot 230, connectors 234 and 237 become electrically and mechanically coupled to each other. When connectors 234 and 237 are so coupled to each other, the card 220 becomes electrically coupled to bus 222 and may exchange data and/or commands with system memory 221, host processor 212, and/or user interface system 216 via bus 222 and chipset 214. Alternatively, without departing from this embodiment, the operative circuitry of the circuit card 220 may be included in other structures, systems, and/or devices. These other structures, systems, and/or devices may be, for example, in the motherboard 232, and coupled to the bus 222. These other structures, systems, and/or devices may be, for example, the chipset 214.

The circuit card 220 may communicate with one or more of the target devices 104a, 104b, 104c, 104d, 104e, 104f, 104g, 104h, 104i via the communication links 105a, 105b using one or more communication protocols. In one instance, one such communication protocol may comply or be compatible with the SAS Standard.

Figure 3:
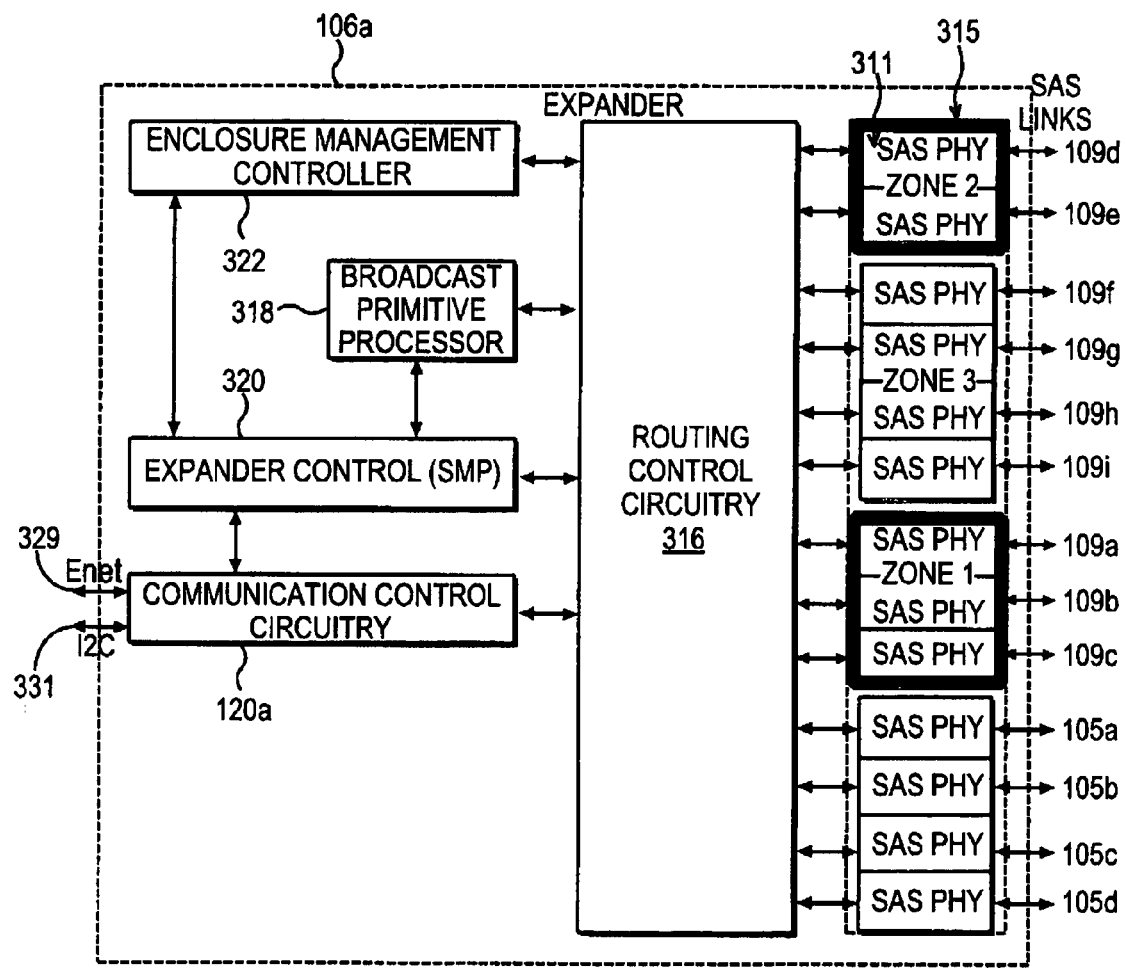
FIG. 3 is a diagram illustrating in greater detail an expander in the system embodiment of FIG. 1.

FIG. 3 is a diagram illustrating in greater detail one embodiment of the expander 106a of the system embodiment of FIG. 1. The expander 106a generally includes communication control circuitry 120a, routing control circuitry 316, and a plurality of SAS phy 311, and a plurality of connection ports 315. A "phy" may be defined as an object and/or circuitry used to interface to one or more devices. The phy may comprise a physical phy containing transceiver circuitry to interface to the applicable communication link. The phy may alternately and/or additionally comprise a virtual phy to interface to another virtual phy or to a physical phy. Each phy may have a unique identifier. A port may contain one or more phys. For example, a narrow port may contain only one phy, while a wide port may contain more than one phy. The expander 106a may also include a broadcast primitive processor 318, expander control 320, and an enclosure management controller 322.

The plurality of SAS phys 311 may couple the associated plurality of communication links 105, 109 to the routing control circuitry 316. For example, a portion of the SAS phys 311 may couple the target devices in the second zone 180d (zone 2) via communication links 109d, 109e to the routing control circuitry 316. Similarly, a portion of the SAS phys 311 may couple the target devices in the third zone 180c (zone 3) via communication links 109f, 109g, 109h, 109i to the routing control circuitry 316. In addition, another portion of the SAS phys 311 may couple the target devices in the first zone 180a (zone 1) via communication links 109a, 109b, 109c to the routing control circuitry 316. Finally, yet another portion of the SAS phys 311 may couple the initiator devices 102a, 102b, 102c, 102d via communication links 105a, 105b, 105c, 105d to the routing control circuitry 316.

The communication control circuitry 120a may be coupled to the routing control circuitry 316. In one embodiment, the communication control circuitry 120a may provide selectable communication control between one device and another device, e.g., between an initiator device and a target device. As used herein, "selectable communication control" may mean selecting a level of communication allowed between one device and another. Such a selection may include a selection that restricts access of one device to another. Such restricted access may include restricting access to read only access.

To accomplish this, the communication control circuitry 120a may evaluate a communication request between one or more devices and then allow such request or not. For example, initiator device 102a of FIG. 1 may request to communicate with target device 104d in zone 180b. The communication control circuitry 120a may evaluate this request and not permit any communication (for example any reading of data from or writing data to) between the initiator device 102a and the target device 104d in this instance.

Read only access may allow one device to only read data from another device, and not be able to write data to such device. To accomplish this, the communication control circuitry 120a may evaluate a read only communication request between one or more devices and then allow such request or not. For example, an initiator device may request to read data from a target device. The communication control circuitry 120a may evaluate and allow such request if such initiator device has, at least, read only access to such target device. However, if the same initiator device requests to write data to the same target device, the communication control circuitry 120a may evaluate and deny such request.

The communication control circuitry 120*a* may also enable designation of at least one zone. In this instance, restricting access to a zone may also include restricting access to read only access to each device in the zone or may include restricting any communication between a selected device and each device in the zone. The communication control circuitry 120*a* may also enable designation of temporary zones. Such temporary zones may be for a predetermined or user specified time interval. Upon expiration of the time interval, the temporary zone is deleted. Such temporary zones may be utilized to assist with system wide back up services, e.g., they may provide exclusive access to a tape device for back up.

The communication control circuitry 120*a* may also enable allocation of bandwidth of a selected path between the devices. As used herein, "bandwidth" may refer to how much information can be carried over a given communication link in a given time period. As used herein, "path" may refer to a communication path between devices. For example, bandwidth of the path 105*a* between the initiator device 102*a* and the expander 106*a* may be allocated among the plurality of target devices 104*a*, 104*b*, 104*c*, 104*f*, 104*g*, 104*h*, 104*i* to allocate more of the available capacity to carry information to and from selected target devices where a relatively larger amount of data may need to be accessed on a relatively more frequent basis.

This may be accomplished by the communication control circuitry 120*a* of the expander 106*a* controlling the number of requests handled by certain devices. For instance, in allocating bandwidth of path 105*a* between device 102*a* and the expander 106*a*, it may be desired to allocate more bandwidth of path 105*a* to requests from target device 104*a* as compared to target device 104*f*. As such, communication control circuitry 120*a* may allow relatively more requests from target device 104*a* than it would allow from target device 104*f*. The communication control circuitry 120*a* may also enable an allocation of various services such as quality of services (QoS) of a selected path between the devices. In such an instance, the communication control circuitry 120*a* may make available predetermined services to selected devices but not to other devices.

The communication control circuitry 120*a* may be responsive to various commands to provide the desired selectable communication control. Such commands may originate from a variety of devices including an initiator device having a HBA. For example, such commands may include in-band specific serial management protocol (SMP) commands when communicating using the SAS Standard. Other commands may be provided to the communication control circuitry 120*a* using out of band interfaces such as a local area network (LAN), e.g., an Ethernet LAN coupled to communication control circuitry via communication link 329. Communication over communication link 329 may comply or be compatible with the Ethernet standard published by the Institute of Electrical and Electronics Engineers (IEEE) titled the IEEE 802.3 standard, published in March, 2002 and/or later versions of this standard. Alternatively, another out of band interface such an I²C Bus may be utilized to provide commands to the communication control circuitry 120*a* via communication link 331. Communication over communication link 331 may comply or be compatible with the "I²C-BUS SPECIFICATION, VERSION 2.1" dated January, 2000 by Philips Semiconductors.

Although the expander 106*a* has been described as having a plurality of ports being coupled to SAS devices in a SAS domain, the expander 106*a* may be equipped to carry out communication with other devices using other communication protocols as well. As used herein, the "SAS domain" means one or more apparatus that may communicate in accordance with the SAS Standard.

Figure 4:
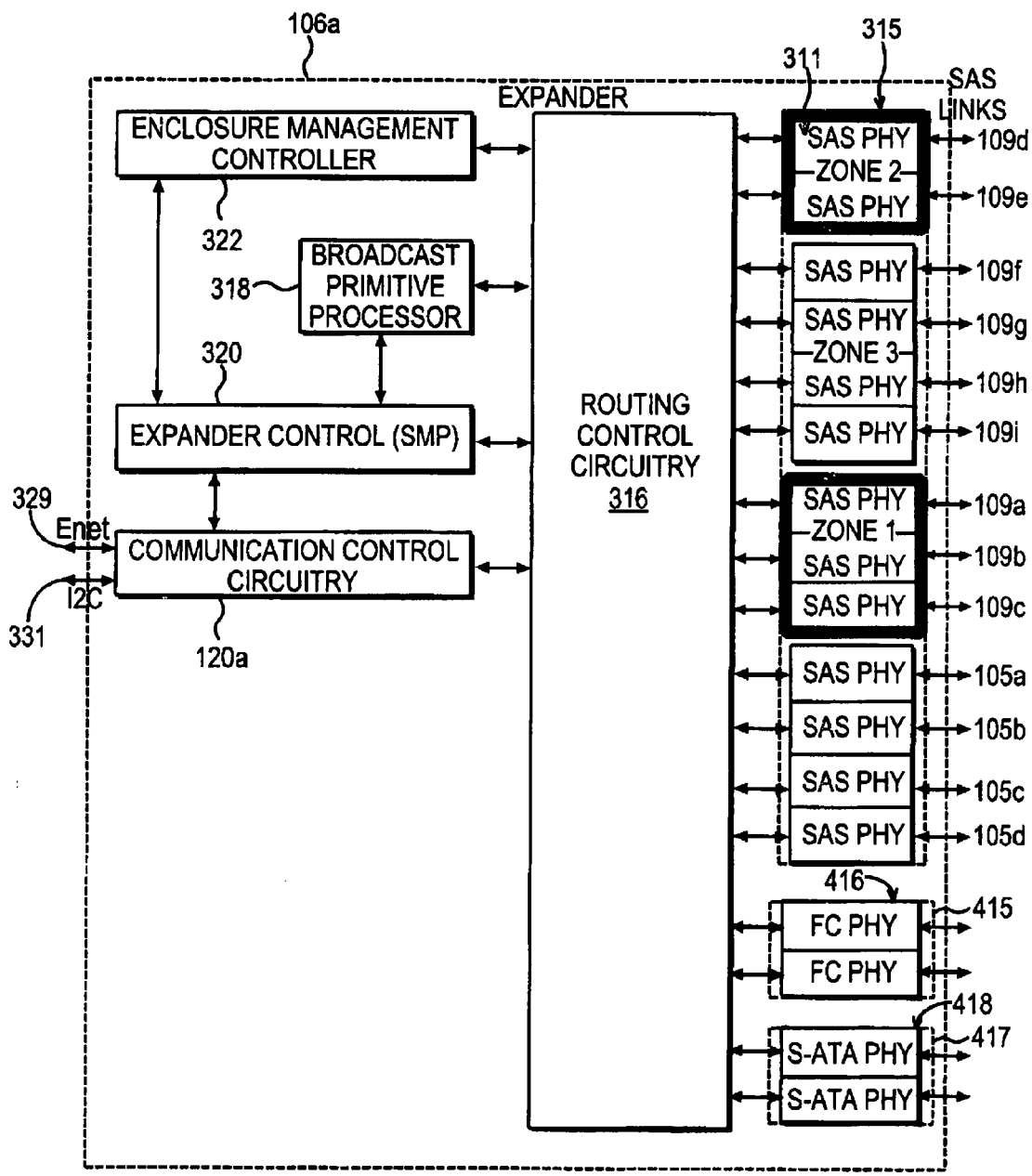
FIG. 4 is a diagram illustrating in greater detail a multi-protocol expander in the system embodiment of FIG. 1.

For example, turning to FIG. 4, the expander 106*a* may be also be able to communicate with a Fibre Channel (FC) device or a Serial Advanced Technology Attachment (S-ATA) device. If an FC protocol is used by the expander 106*a* to exchange data and/or commands between a FC initiator device and a FC target device, the FC protocol may comply or be compatible with the interface/protocol described in American National Standards Institute (ANSI) Standard Fibre Channel (FC) Physical and Signaling Interface-3 X3.303: 1998 Specification. The expander 106*a* may have an associated layer of FC ports 415 and phys 416 in this instance to communicate with FC devices. An initiator device and a target device capable of communicating using the FC protocol are referred to herein, respectively, as an "FC initiator device" and "FC target device."

Alternatively, if a S-ATA protocol is used by the expander 106*a* to exchange data and/or commands between the a S-ATA initiator device and a S-ATA target device, the S-ATA protocol may comply or be compatible with the protocol described in "Serial ATA: High Speed Serialized AT Attachment," Revision 1.0, published on Aug. 29, 2001 by the Serial ATA Working Group. The S-ATA protocol may also be implemented using a Serial ATA Tunneled Protocol (STP) mapping protocol. The expander 106*a* may include an associated layer of S-ATA ports 417 and phys 418 in this instance to communicate with S-ATA devices. In such an instance of a multiple communication protocol expander, zones may further be created based on communication protocol types. For example, there may be several SAS zones, a FC zone, a S-ATA zone, or a STP/S-ATA zone created. An initiator device and a target device capable of communicating using the S-ATA protocol are referred to herein, respectively, as a "S-ATA initiator device" and "S-ATA target device."

In addition, the expanders 106*a*, 106*b* may also be equipped with retimer circuitry (not shown) to retime an incoming data stream and generate a retimed data stream at the output of the retimer circuitry. Retiming the data stream may operate to reduce noise events which may occur over longer cable lengths. The retiming of the data stream may also operate to reduce noise effects below a defined tolerance level. The retimer circuitry may also include amplification circuitry and/or a buffer. Such retimer circuitry may therefore enable increased distances between initiator and target devices.

FIG. 5 is a flow chart of exemplary operations 500 consistent with an embodiment. A zone may be designated in operation 502. The zone may comprise at least a first device of a plurality of devices. For example, the second zone 180*b* of FIG. 1 includes two devices 140*d*, 140*e*. Of course, a zone may include any number of target and/or initiator devices. Operation 504 may control communication between at least one other device of the plurality of devices and the first device. The first device and the other device may be capable of communicating in accordance with a SAS protocol.

It will be appreciated that the functionality described for all the embodiments described herein may be implemented using hardware, firmware, software, or a combination thereof. If implemented in software, a processing element, e.g., a processor 212, and one or more machine readable media may be utilized. One exemplary processing element may be a processor from the Pentium® family of processors made by the Assignee of this application, or the family of processors made by Motorola. Machine-readable media include any media capable of storing instructions adapted to be executed by a processing element. Some examples of such media include, but are not limited to, read-only memory (ROM), random-access memory (RAM), programmable ROM (PROM), erasable programmable ROM (EPROM), electronically erasable programmable ROM (EEPROM), dynamic RAM (DRAM), magnetic disk (e.g. floppy disk and hard drive), optical disk (e.g. CD-ROM), and any other device that can store information. Further, the processing element and machine-readable medium may be part of a larger system that may contain various combinations of machine-readable storage devices through various input/output (I/O) controllers, which may be accessible by the processing element and which may be capable of storing a combination of computer program instructions and data.

Thus, in summary, one system embodiment may comprise a plurality of devices capable of communicating in accordance with a SAS protocol, and circuitry to provide selectable communication control between at least a first device and at least a second device of the plurality of devices. The first device may comprise a circuit card and a bus. The circuit card may be capable of being coupled to the bus and the circuitry.

Another embodiment may include an apparatus. The apparatus may comprise a plurality of ports capable of being coupled to a plurality of devices via an associated plurality of communication links, the links being compliant with a SAS protocol, and circuitry to provide selectable communication control between at least a first device and at least a second device of the plurality of devices.

Advantageously, the apparatus of these embodiments may enable enhanced communication control between devices such as SAS initiator devices and SAS target devices. Such communication control may include the designation of zones. Such zones may include one or more SAS target devices. The apparatus may then control communication between SAS initiator devices and such zones. The communication control may include variety of controls including prohibiting access of one or more SAS target devices to one or more zones. Therefore, access to certain SAS devices may be effectively controlled by the expander by allowing selected SAS devices access to one or more zones but not allowing other selected SAS devices access to other zones.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. An apparatus comprising:
a Serial Attached Small Computer Systems Interface (SAS) expander configured to communicate with a plurality of SAS devices using, at least in part a SAS protocol, the expander comprising:
a plurality of ports capable of being coupled to a plurality of SAS devices via an associated plurality of communication links, the links being compliant with SAS protocol; and
communication control circuitry to provide selectable communication control between at least a first device and at least a second device of said plurality of SAS devices, said communication control circuitry configured to designate at least one zone among said plurality of SAS devices, said communication control circuitry further configured to evaluate a communication request from one of said plurality of SAS devices to allow or deny said communication request based upon said at least one zone.

2. The apparatus of claim 1, wherein said selectable communication control comprises restricting access between at least said first device and at least said second device.

3. The apparatus of claim 1, wherein said at least one zone comprises a third device and fourth device, and wherein said selectable communication control comprises restricting access of at least said first device to at least said third and fourth device of said zone.

4. The apparatus of claim 1, wherein selectable communication control comprises allocating bandwidth of at least one selected path between at least said first device and at least said second device.

5. A system comprising:
a plurality of devices capable of communicating in accordance with Serial Attached Small Computer Systems Interface (SAS) protocol;
a SAS expander configured to communicate with a plurality of SAS devices using, at least in part the SAS protocol, the SAS expander including communication control circuitry to provide selectable communication control between at least a first SAS device and at least a second SAS device of said plurality of SAS devices, said communication control circuitry configured to designate at least one zone among said plurality of SAS devices, said communication control circuitry further configured to evaluate a communication request from one of said plurality of SAS devices to allow or deny said communication request based upon said at least one zone; and
said first device comprising a circuit card and a bus, said circuit card being capable of being coupled to said bus and said circuitry.

6. The system of claim 5, wherein said selectable communication control comprises restricting access between at least said first device and at least said second device.

7. The system of claim 5, wherein said at least one zone comprises a third device and fourth device, and wherein said selectable communication control comprises restricting access of at least said first device to at least said third and fourth device of said zone.

8. The system of claim 5, wherein said selectable communication control comprises allocating bandwidth of at least one selected path between at least said first device and at least said second device.

9. A method comprising:
designating at least one zone via communication control circuitry located within a SAS expander, said SAS expander configured to communicate with a plurality of SAS devices using, at least in part a SAS protocol, said at least one zone comprising at least a first device of a plurality of SAS devices;
controlling communication between at least one other of said plurality of SAS devices and said first device via communication control circuitry, said first device and said other device being capable of communicating in accordance with a Serial Attached Small Computer Systems Interface (SAS) protocol; and
evaluating a communication request from one of said plurality of devices, at said communication control circuitry, to allow or deny said communication request based upon said at least one zone.

10. The method of claim 9, wherein said controlling communication comprises restricting access of said other device to said first device in said zone.

11. The method of claim 10, wherein said restricting access comprises restricting any communication between said first device and said other device.

12. The method of claim 10, wherein said other device is capable of reading data from said first device.

13. An apparatus comprising:
a SAS expander configured to communicate with a plurality of SAS devices using, at least in part a SAS protocol, said expander comprising:
a plurality of first ports capable of coupling a plurality of first SAS devices together via an associated plurality of first communication links, said plurality of first SAS devices being capable of communicating via a first communication protocol, said first communication protocol comprising a Serial Attached Small Computer Systems Interface (SAS) communication protocol;
a plurality of second ports capable of coupling a plurality of second SAS devices together via an associated plurality of second communication links, said plurality of second SAS devices being capable of communicating via a second communication protocol, said second communication protocol comprises a Serial Advanced Technology Attachment (S-ATA) communication protocol; and
communication control circuitry to provide selectable communication control between at least a first one of said plurality of first SAS devices and a second one of said plurality of first SAS devices, said communication control circuitry configured to designate at least one zone among said plurality of SAS devices, said communication control circuitry further configured to evaluate a communication request from one of said plurality of devices to allow or deny said communication request based upon said at least one zone.

14. The apparatus of claim 13, wherein said selectable communication control comprises restricting access between at least said first one and said second one of said plurality of first devices.

15. The apparatus of claim 13, wherein said zone comprises a third device and fourth device, and wherein said selectable communication control comprises restricting access of at least said one of said first plurality of devices to said third and fourth device of said zone.

16. The apparatus of claim 13, wherein said selectable communication control comprises allocating bandwidth of at least one selected path between at least said first one and said second one of said plurality of first devices.

17. An article comprising:
a machine readable medium having stored thereon instructions that when executed by a machine result in the machine performing operations comprising:
designating at least one zone via communication control circuitry located within a SAS expander, said SAS expander configured to communicate with a plurality of SAS devices using, at least in part a SAS protocol, said at least one zone comprising at least a first device of a plurality of SAS devices;
controlling communication between at least one other of said plurality of devices and said first device via communication control circuitry, said first device and said other device being capable of communicating in accordance with a Serial Attached Small Computer Systems Interface (SAS) protocol; and
evaluating a communication request from one of said plurality of SAS devices, at said communication control circuitry, to allow or deny said communication request based upon said at least one zone.

18. The article of claim 17, wherein said controlling communication comprises restricting access of said other device to said first device in said zone.

19. The article of claim 18, wherein said restricting access comprises restricting any communication between said first device and said other device.

20. The article of claim 18, wherein said other device is capable of reading data from said first device.

* * * * *